(12) United States Patent
Ben Dayan et al.

(10) Patent No.: US 11,733,866 B2
(45) Date of Patent: *Aug. 22, 2023

(54) ELECTRONIC STORAGE SYSTEM

(71) Applicant: Weka. IO Ltd., Tel Aviv (IL)

(72) Inventors: Maor Ben Dayan, Tel Aviv (IL); Liran Zvibel, Tel Aviv (IL); Omri Palmon, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/540,403

(22) Filed: Dec. 2, 2021

(65) Prior Publication Data
US 2022/0091748 A1 Mar. 24, 2022

Related U.S. Application Data

(63) Continuation of application No. 15/283,553, filed on Oct. 3, 2016, now Pat. No. 11,237,727.

(60) Provisional application No. 62/237,140, filed on Oct. 5, 2015.

(51) Int. Cl.
G06F 3/06 (2006.01)
G06F 16/182 (2019.01)
G06F 16/18 (2019.01)

(52) U.S. Cl.
CPC .......... *G06F 3/0605* (2013.01); *G06F 3/061* (2013.01); *G06F 3/067* (2013.01); *G06F 3/0617* (2013.01); *G06F 3/0635* (2013.01); *G06F 3/0659* (2013.01); *G06F 3/0688* (2013.01); *G06F 16/183* (2019.01); *G06F 16/1847* (2019.01); *G06F 2206/1012* (2013.01)

(58) Field of Classification Search
None
See application file for complete search history.

(56) References Cited

U.S. PATENT DOCUMENTS

| | | | |
|---|---|---|---|
| 7,552,356 B1 | 6/2009 | Waterhouse et al. | |
| 2006/0168415 A1 | 7/2006 | Ishii et al. | |
| 2015/0006846 A1* | 1/2015 | Youngworth | G06F 3/0619 711/216 |

OTHER PUBLICATIONS

European Office Communication Appln. No. 16853153.1 dated Nov. 5, 2020.

(Continued)

*Primary Examiner* — Edward J Dudek, Jr.
*Assistant Examiner* — Ralph A Verderamo, III
(74) *Attorney, Agent, or Firm* — McAndrews, Held & Malloy, Ltd.

(57) ABSTRACT

Methods and systems for electronic storage are provided. A storage system comprises a plurality of storage system front ends, a plurality of storage system back ends, and a plurality of solid state drive (SSD) agents. Each storage system front end resides on a server of a plurality of servers. Each server of the plurality of servers comprises one or more storage system back ends of the plurality of storage system back ends. Each storage system front end is able to receive I/O requests and relay information associated with the I/O requests to a relevant storage system back end. The relevant storage system back end communicates metadata associated with the I/O request to an SSD via an SSD agent.

20 Claims, 2 Drawing Sheets

(56) References Cited

OTHER PUBLICATIONS

Chris Evans: "Erasure coding vs Raid for disk rebuilds", , May 14, 2015 (May 14, 2015), pp. 1-3, XP055745365, ComputerWeekly.com Retrieved from the Internet: URL:https://www.computerweekly.com/feature/Erasure-coding-vs-Raid-for-disk-rebuilds [retrieved on Dec. 4, 2020].

Extended European Search Report Appln. No. 16853153.1 dated Apr. 5, 2019.

Int'l Preliminary Report on Patentability Appln PCT/IP2016/001521 dated Apr. 19, 2018 (6 pgs).

European Office Communication with extended Search Report Appln No. 22193756.8 dated Mar. 8, 2023.

Chris Evans: "Erasure coding vs Raid for disk rebuilds", May 14, 2015 (May 14, 2015), pp. 1-3, XP055745365, ComputerWeekly.com Retrieved from the Internet: URL:https://www.computerweekly.com/feature/Erasure-coding-vs-Raid-for-disk-rebuilds [retrieved on Oct. 29, 2020].

* cited by examiner

ELECTRONIC STORAGE SYSTEM

CROSS-REFERENCE TO RELATED APPLICATIONS/INCORPORATION BY REFERENCE

This patent application is a continuation of U.S. application Ser. No. 15/283,553, filed Oct. 3, 2016, which makes reference to, claims priority to, and claims the benefit from U.S. Provisional Application Ser. No. 62/237,140, which was filed on Oct. 5, 2015. Each of the aforementioned documents is hereby incorporated herein by reference in its entirety.

BACKGROUND

Limitations and disadvantages of conventional and traditional approaches to file systems will become apparent to one of skill in the art, through comparison of such systems with some aspects of the present invention as set forth in the remainder of the present application with reference to the drawings.

BRIEF SUMMARY OF THE INVENTION

Systems and methods are provided for a virtualized distributed file system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Described herein are example implementations of a storage system comprising one or more computing devices (e.g., a server cluster) configured via software and/or firmware to provide one or more distributed file systems to client applications (which may also reside on the computing device(s) and/or on other computing devices communicatively coupled to the one or more computing device(s) via one or more network links). One or more file systems of the storage system may be spread across both locally-attached storage (e.g., solid state drives which are FLASH based or otherwise) and an object store (which may be on-premises and/or cloud-based).

The storage system enables client applications to access the file system(s) either via a standardized protocol such as NFS or SMB and/or a file system driver installed on the one or more computing devices. The storage system provides high availability to the file system(s), and high reliability of the file system(s), while concurrently providing resiliency to prevent data loss in the event of failures. The storage system provides for effective parallel distributed implementation, tiered storage between solid state drives (SSDs) and Object Stores, and erasure coding-based efficient protection.

In an example configuration, processes of the storage system run on a single processing core on each of the one or more computing devices. For example, for a cluster of 100 servers, processes of the storage system may run on one processing core on each of the 100 servers comprising the cluster. The number of cores per computing device that run storage system processes, however, may be flexible and may be configured based on the amount of performance required. For example, when higher performance is needed, then storage system processes may run on two cores per computing device, instead of one.

The storage system supports POSIX, NFS, and/or other standardized protocols. The performance of the storage system scales linearly with the number of cores and SSDs allocated to it. Policy-based data tiering between local SSDs and object stores may be used for one or more file systems of the storage system. The tiering policy(ies) may be may be user configurable and based on various file attributes and I/O patterns. The storage system provides highly reliable, space-efficient erasure-coding protection for each of its file systems. The storage system and its file systems are such that they are resilient to a user-configured number of failures. The storage system operates to seek an optimal distribution of the workload on the computing devices (e.g., in terms of minimizing latency, maximizing throughput, maximizing mean time between failures, and/or some other performance metric).

Figure 1:
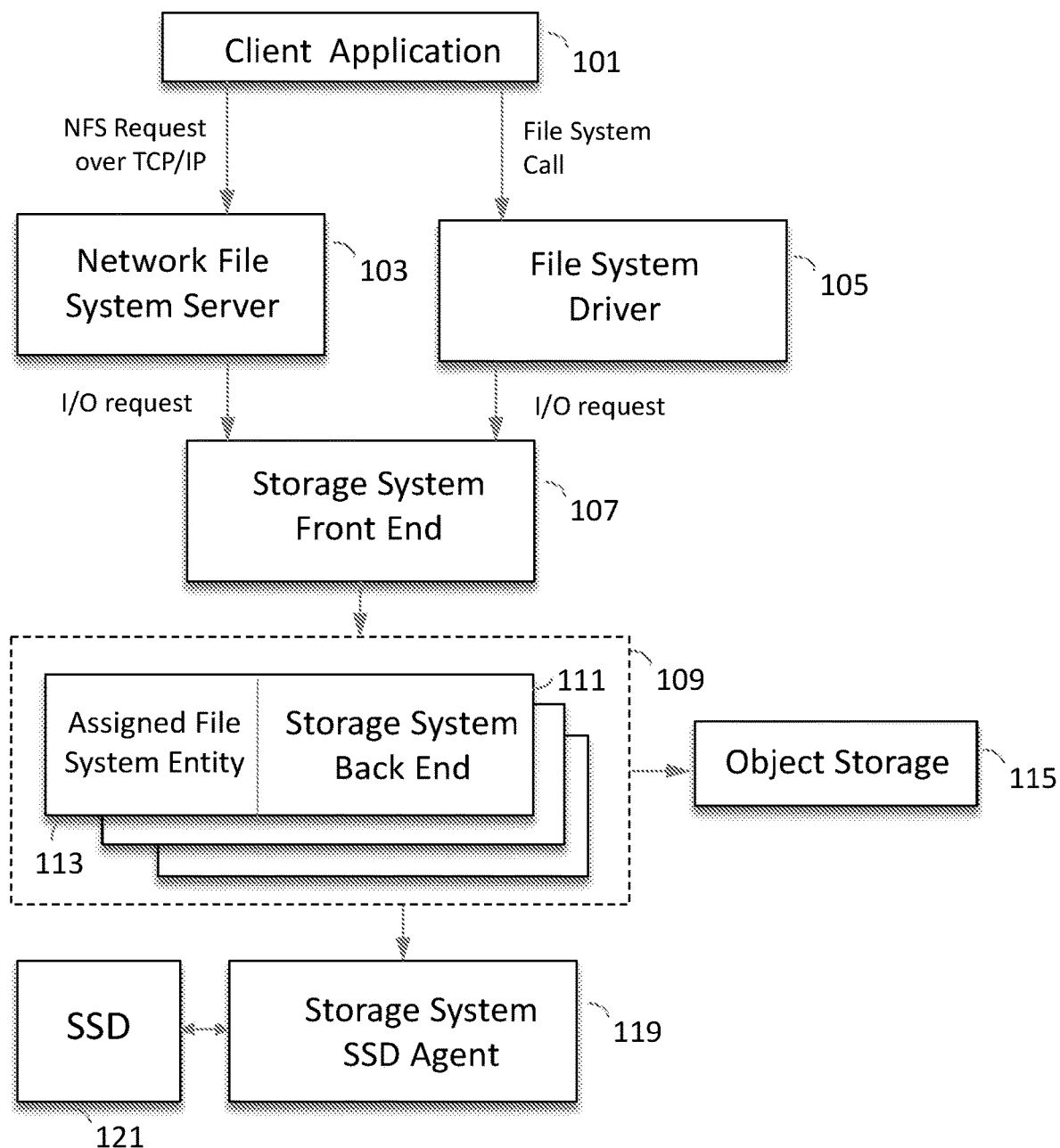
FIG. 1 illustrates components of an example implementation of the storage system.

FIG. 1 illustrates components of an example implementation of the storage system 100. A client application 101 may generate a file system request. If it is an NFS request over the TCP/IP network, it is received by the storage system NFS server 103, which generates an I/O request. If it is a local (e.g., POSIX) file system call, it is intercepted by the file system driver 105 which generates an I/O request. The I/O request from the NFS server 103 or file system driver 105 is then received by a storage system front end 107, which relays the data to the relevant storage system back end 111 of a plurality of storage system back ends 109. The back end 111 stores the relevant information on Object Storage 115, as well as communicates with the SSD agent 119.

The storage system Network File System (NFS) server 103 may be configured specifically for the storage system. Any one of the computing devices can be configured to run as an NFS server 103, in order to provide file-level access to the file system(s). The storage system 100 may be configured such that, where an application runs on the same computing device as an NFS server 103, NFS requests by that application will be handled by the NFS server 103 to ensure that NFS traffic always runs locally on the server, which improves performance and reliability.

The file system driver 105 may be a standard LINUX file system driver that intercepts POSIX file system calls and relays them to the storage system front end 107. The file system driver 105 may be below the operating system cache.

The storage system front end 107 may be a very thin stateless layer that serves I/Os from local applications on the same server. The storage system front end 107 may be operable to accept any I/O request, identify which back end component 111 owns the relevant piece of data 113, and relay the I/O request to that back end 111 of the plurality of back ends 109. The front end 107 may be aware of the status of the one or more computing devices, including any failure events or cluster expansion processes.

The plurality of storage system back ends 109 may be responsible for all I/O operations, resiliency, redundancy, file system operations, and so on. Each back end of the plurality of storage system back ends 109 may be responsible for only a small part of one or more file systems. Each entity 113 in a file system may be owned by a single back end component 111.

The SSD Agent 119 resides on each server that contains an SSD 121 used by the storage system 100. The SSD Agent 119 provides the SSD 121 with access to all back end nodes 109 on the one or more computing devices.

The object storage gateway enables the plurality of storage system back ends 109 to push/get information to/from the object store(s) 115.

The storage system 100 may operate to evenly distribute the handling and storage of data across all hardware resources in the system without any user configuration (or to distribute as desired per user configuration). Each entity in the file system may be assigned 113 to a single back end 111, which may ensure optimal (as measured by a performance metric) load balancing across all back ends 109. Assigning a back end component 111 to each file system entity 113 ensures that performance is scalable, based on the resources (e.g., number of processing cores) dedicated to the storage system 100, and that no hotspots occur where one back end handles more of the load than others. The storage system 100 may operate to ensure optimal load balancing in all circumstances and under any kinds of configuration changes in the system, including changes due to failing hardware (e.g., a server or SSD). Thus the high-performance parameters that derive from the storage system are fully scalable.

Figure 2:
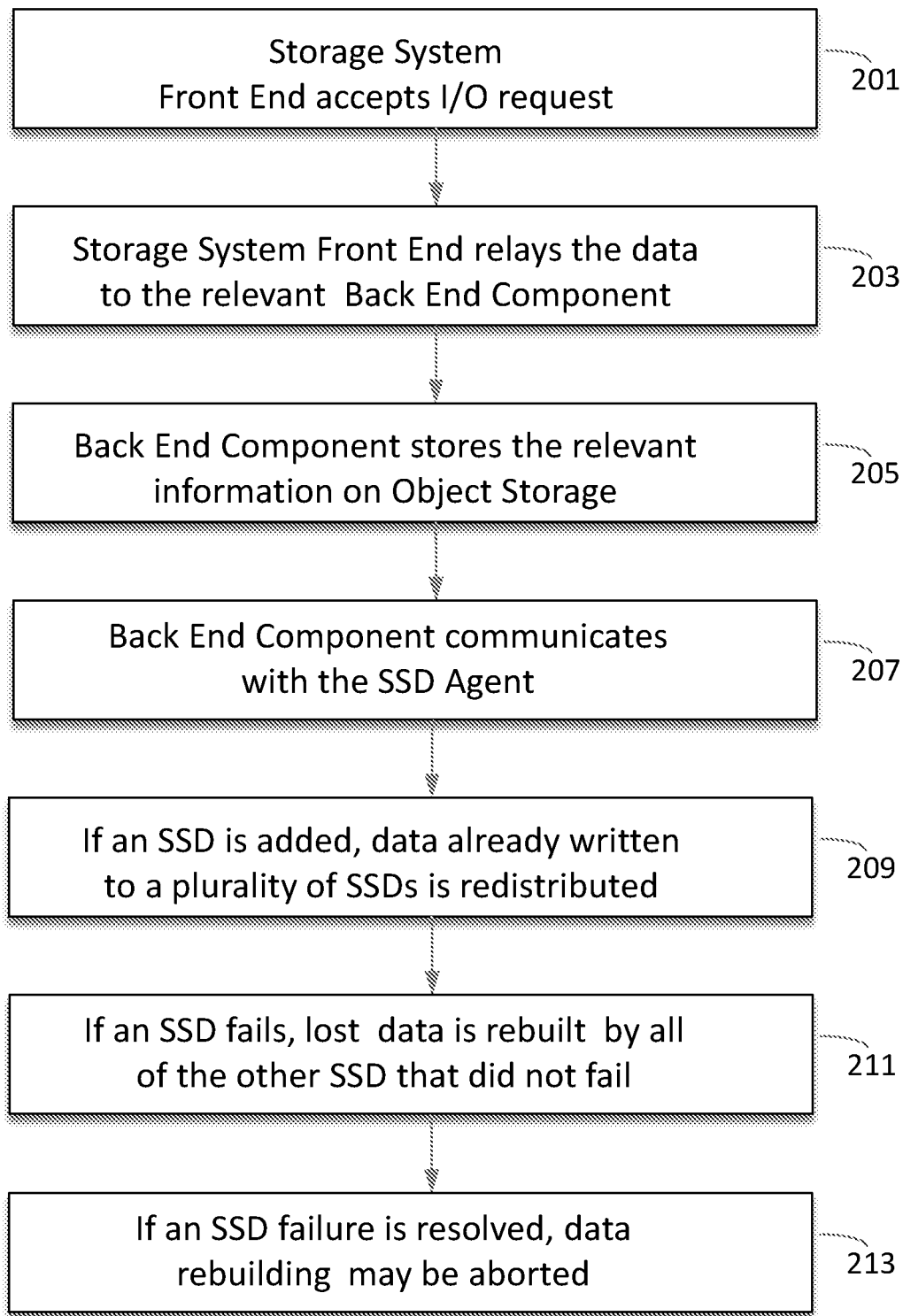
FIG. 2 illustrates an example flow of information through the storage system.

FIG. 2 illustrates an example flow 200 of information through the storage system 100. At 201, a storage system front end accepts an I/O request from an NFS server or a file system driver. At 203, the storage system front end relays the data of the I/O request to the relevant storage system back end component. At 205, the back end component stores the relevant information on Object Storage. At 205, the storage system back end component communicates with the SSD agent.

Optimal load balancing may be maintained for both system expansions and system reductions. When SSDs are added, data already written to the system may be redistributed in order to evenly spread the data among all SSDs and disk drives in the expanded system at 209. Reliability, availability and performance may be unaffected during and after such redistribution processes. In the storage system 100, data distribution is equivalent to a full, optimal virtualization of file systems across the storage resources of the system. Under this virtualization, I/O activity performed in the system takes full advantage of all the available physical resources at any point in time. Write and read requests directed at any particular file system harness the entire CPU power, internal bandwidth and disk capacity, nearly eliminating bottlenecks.

Resiliency in the storage system 100 may be based on distributed, space-efficient erasure coding that ensures resiliency to multiple failures. Resiliency may be configurable by the user, who may dictate both the stripe size and the protection level.

The protection configuration of the storage system 100 may be purely logical and not involve any physical component. This is in contrast to methods in which a group of SSDs are all intended to protect each other. For example, consider a conventional RAID 5 scenario consisting of 100 SSDs. These 100 SSDs might be partitioned into 20 groups of five drives each, where all the SSDs in each RAID 5 group protect one another. In this case, for each RAID 5 group, the five SSDs in the group protect each other, and one of the SSDs in the group holds the parity of the other four SSDs. In contrast, the storage system described herein may work on the logical level so that all SSDs protect each other. As such, it uses only the logical parts of the five SSDs within a RAID 5 group. In the storage system described herein, protection may be any-to-any, meaning that upon the failure of a single SSD, all the other SSDs in the system participate in the rebuild process at 211. At the end of the rebuild process, the system is again optimally load balanced for the remaining (non-failed) components.

In some circumstances, the storage system may not be able to access an SSD due to an SSD failure, server failure, or network problem. In such cases, the storage system may use erasure coding to recompute the missing data from the other available components. This mode of operation is referred to herein as "degraded mode." After a specified timeout of several minutes, the storage system may define the data that resided on that component as lost and rebuild the data. Because the rebuild process is fully distributed, the process involves all the CPUs and all the SSDs in the system. During the rebuild process, new data is rebuilt onto all existing SSDs. This means that at the end of the process, the cluster is again fully balanced. If at any point before the rebuild process starts or while the rebuild process is in effect, the missing component is made accessible again (for example, due to the resolution of a temporary problem), then the rebuild process may never start or may be aborted midstream at 213. For example, typically, a server reboot does not initiate a rebuild process, but rather may force degraded mode reads for several minutes. When the rebooted server is detected again by the cluster, the system reverts to normal operation mode. Even if a server is down for a longer period or if it returns to an online state while the rebuild process is in progress, then the rebuild process may be aborted and the data rebuilt on that server (up to that point) can be used. This means that all data rebuilt before terminating the rebuild process is usable.

When a group of servers becomes inaccessible due to a single external failure, the result is referred to herein as a "failure domain." For example, a failure domain may result when a top of rack switch fails, making all the servers in that rack inaccessible. The storage system's erasure coding may be configured to take failure domain definitions into account, in order to ensure that its erasure-coding stripe never has more than one representative from each failure domain. For such a configuration, any single hardware component, even if it causes loss of access to multiple servers concurrently, never causes any data loss or unavailability of data on the system.

The storage system may acknowledge the host for the successful termination of any operation (such as writes, reads and so on). Any after-effects of such operations are safely de-staged to the SSDs. As a result, even a complete simultaneous power failure that affects an entire data center never results in any data inconsistency or data loss, and requires no uninterruptible power supply (UPS) system or special non-volatile RAM (NVRAM) to achieve this result. Even after a power outage, the storage system provides services instantly and does not require a long data-scanning process.

The storage system may be configurable so that the each file system is either solely on the SSDs or tiered. Maintaining the file system solely on the SSDs delivers optimal performance. For a tiered file system, only the hot data is held on the local SSDs and the cold data is held in local or cloud base object storage. Object storage is the simplest and most cost-effective storage type. It is scalable to dozens of peta bytes, but is also a low performing storage solution that is not suitable for use as primary storage. The tiering performed by the storage system ensures that object storage is only used for cold data. This approach means that the storage system benefits from the cost effectiveness of object storage technology, while not being adversely affected by its typically lower performance. This combined approach makes storage system flexible such that it can provide either optimal performance or cost-effectiveness, depending on user needs and configuration. In order to determine which files should be stored on the SSDs and which should be stored on object storage, the storage system may use any one or more of a variety of criteria in its tiering process, such as the last modification time or access time.

The tiering process may be implemented as follows. All file system metadata is always stored on an SSD. This means that any file system metadata operation, file search operation or complete traversal of the entire file system only involves access to high-performing, low-latency SSDs. Any write operation is written to an SSD, regardless of whether it created a new file, replaced the content of an existing file or appended to an existing file. Data is migrated from the SSD to the data store as a background asynchronous process, which never affects any I/O operation. An object store can be on-premises object storage (such as a commercial product) or a system based on public domain code. An object store can also be a cloud-based object service, such as Amazon Web Services (AWS) Glacier or Google Nearline. This type of object storage is especially effective when the system must store and potentially access large amounts of compliance data that must be retained, but is seldom accessed in practice. For example, a configuration may require storage of the previous month's log files on SSDs, as well as storage of complete historical record files. To achieve this, the previous month's log files must be stored on high performance, readily accessible SSDs, and the historical record files must be stored on Object Storage. Without features of the storage system described herein, this scenario would require a major, non-trivial software implementation that scans the local SSDs and migrates relevant data to object storage. The storage system, however, enables this type of implementation through a simple policy configuration. One strength of the storage system is its ability to support multiple types of object systems, either implemented on-premises or in the cloud, as well as migrate data between such systems (should the need arise). The storage system combines superior high-performance access when handling recent logs, while maintaining a reasonable cost point when retaining all historical logs.

When information is de-staged from an SSD to object storage, the actual content is not deleted from the SSD. Instead, the content is retained in order to enable instant, high performance access to it through the SSDs. The data is vacated from the SSD in order to make room for other content. This may only occur when space is needed for newly written data.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising: configuring each of a plurality of servers with one or more storage system back ends of a plurality of storage system back ends; organizing the plurality of storage system back ends into a plurality of erasure-coded stripes, wherein each erasure-coded stripe spans more than one failure domain; relaying information associated with an I/O request to a particular storage system back end of the plurality of storage system back ends; communicating metadata associated with the I/O request, via an solid state drive (SSD) agent of a plurality of SSD agents, between the particular storage system back end and a first SSD of a plurality of SSDs; writing the information associated with the I/O request to the first SSD, wherein the I/O request is a write operation; and migrating the information associated with the I/O request from the first SSD to an object store as a background asynchronous process.

2. The method of claim 1, wherein the object store is cloud-based.

3. The method of claim 1, comprising: adding a second SSDs to the plurality of SSDs of the storage system; and redistributing data already written to the plurality of SSDs, wherein the redistribution is a virtualization of the storage system across the plurality of SSDs.

4. The method of claim 1, comprising: detecting a failure of the first SSD; rebuilding data of the first SSD via data distributed across all SSDs of the plurality of SSDs that have not failed; and load balancing the data distributed across all SSDs of the plurality of SSDs that have not failed.

5. The method of claim 4, wherein rebuilding begins after the failure has been detected for a specified timeout.

6. The method of claim 4, comprising: detecting a resolution of the failure of the first SSD; and aborting the rebuilding according to the resolution.

7. The method of claim 1, wherein the method is caused to be performed by a machine that is executing code that is stored on a non-transitory machine-readable storage.

8. A storage system comprising:
a plurality of storage system back ends organized into a plurality of erasure-coded stripes, wherein each erasure-coded stripe spans more than one failure domain;
a plurality of servers, wherein each of the servers is associated with one or more storage system back ends of the plurality of storage system back ends;
a plurality of solid state drives (SSDs); and
a plurality of SSD agents, wherein when information associated with an I/O request is relayed to a particular storage system back end of the plurality of storage system back ends:
    metadata associated with the I/O request is communicated, via an SSD agent of a plurality of SSD agents, between the particular storage system back end and a first solid state drive (SSD) of the plurality of SSDs;
    the information associated with the I/O request is written to the first SSD; and
    the information associated with the I/O request is migrated from the first SSD to an object store as a background asynchronous process.

9. The storage system of claim 8, wherein the object store is cloud-based.

10. The storage system of claim 8, comprising:
a second SSD, wherein the second SSD is added to the plurality of SSDs of the storage system and data already written to the plurality of SSDs is redistributed, wherein the redistribution is a virtualization of the storage system across the plurality of SSDs comprising the second SSD.

11. The storage system of claim 8, wherein the detection of a failure of the first SSD causes data of the first SSD to be rebuilt via data that is distributed across all SSDs of the plurality of SSDs that have not failed, the distributed data being load balanced across all SSDs of the plurality of SSDs that have not failed.

12. The storage system of claim 11, wherein the rebuilding begins after the failure has been detected for a specified timeout.

13. The storage system of claim 11, wherein the rebuilding is aborted if the failure of the first SSD is resolved before the rebuilding is complete.

14. A method caused to be performed by a machine that is executing code stored on a non-transitory machine-readable storage, the method comprising:
configuring each of a plurality of servers with one or more storage system back ends of a plurality of storage system back ends;
organizing the plurality of storage system back ends into a plurality of erasure-coded stripes, wherein each erasure-coded stripe spans more than one failure domain;
relaying information associated with an I/O request to a particular storage system back end of the plurality of storage system back ends;
communicating metadata associated with the I/O request, via an solid state drive (SSD) agent of a plurality of SSD agents, between the particular storage system back end and a first SSD of a plurality of SSDs;
writing the information associated with the I/O request to the first SSD; and
migrating the information associated with the I/O request from the first SSD to an object store as a background asynchronous process.

15. The method of claim 14, wherein the object store is cloud-based.

16. The method of claim 14, comprising:
adding a second SSDs to the plurality of SSDs of the storage system; and
redistributing data already written to the plurality of SSDs, wherein the redistribution is a virtualization of the storage system across the plurality of SSDs.

17. The method of claim 14, comprising:
detecting a failure of the first SSD;
rebuilding data of the first SSD via data distributed across all SSDs of the plurality of SSDs that have not failed; and
load balancing the data distributed across all SSDs of the plurality of SSDs that have not failed.

18. The method of claim 17, wherein rebuilding begins after the failure has been detected for a specified timeout.

19. The method of claim 17, comprising:
detecting a resolution of the failure of the first SSD; and aborting the rebuilding according to the resolution.

20. The method of claim 14, wherein the I/O request is a write operation.

* * * * *